United States Patent [19]

Bezard et al.

[11] Patent Number: 4,513,616
[45] Date of Patent: Apr. 30, 1985

[54] APPARATUS FOR MONITORING THE LEVEL OF LIQUID BY RESISTIVE WIRE

[75] Inventors: Jean-Jacques Bezard, La Garenne; Charles H. Jourdain, Frepillon; Bruno Lalanne, Courbevoie, all of France

[73] Assignee: J A E G E R, Levallois-Perret, France

[21] Appl. No.: 424,442

[22] Filed: Sep. 27, 1982

[30] Foreign Application Priority Data

Oct. 8, 1981 [FR] France ................... 81 18960

[51] Int. Cl.³ .................... G01F 23/24; G01K 7/16
[52] U.S. Cl. ............................. 73/295; 73/313; 364/509; 364/571
[58] Field of Search ............... 73/295, 304 R; 338/27; 340/622; 364/571, 509

[56] References Cited

U.S. PATENT DOCUMENTS

| 3,465,588 | 9/1969 | Slavin | 73/304 R |
|---|---|---|---|
| 4,163,391 | 8/1979 | Bezard et al. | 73/295 |
| 4,217,777 | 8/1980 | Newman | 73/291 X |
| 4,229,972 | 10/1980 | Phillips et al. | 73/304 R |
| 4,236,144 | 11/1980 | Sunagawa | 73/292 |
| 4,258,422 | 3/1981 | Dougherty et al. | 73/304 C X |
| 4,303,984 | 12/1981 | Houvig | 73/304 R X |
| 4,355,363 | 10/1982 | Colby et al. | 364/509 |
| 4,356,728 | 11/1982 | Gomez | 73/295 |
| 4,390,793 | 6/1983 | John | 73/304 R |
| 4,425,795 | 1/1984 | Albrecth et al. | 73/295 |

FOREIGN PATENT DOCUMENTS

| 0155646 | 12/1980 | Fed. Rep. of Germany | 73/304 R |
|---|---|---|---|
| 93024 | 7/1980 | Japan | 73/304 R |
| 0366663 | 2/1930 | United Kingdom | 73/304 R |
| 2097932 | 11/1982 | United Kingdom | 73/304 R |

Primary Examiner—Daniel M. Yasich
Attorney, Agent, or Firm—Schwartz, Jeffery, Schwaab, Mack, Blumenthal & Koch

[57] ABSTRACT

A hot-wire level detecting apparatus includes a microprocessor which registers a look-up table of digital level values associated with digital values of a differential parameter representing the change in the voltage or current in the hot-wire probe. The micro-processor controls a switch for initiating the application of power to the probe. In one embodiment a constant voltage supply is connected across the emitter and collector of a transistor with the probe in the emitter circuit and a resistor in the collector circuit. The voltage across the resistor, measured at switch-on and after a period for stabilization, is fed to the micro-processor by an analog-digital converter.

26 Claims, 11 Drawing Figures

FIG_1

FIG_2

FIG_3

FIG_4

FIG_1A

FIG_2A

FIG_3A

FIG_4A

FIG_4B

APPARATUS FOR MONITORING THE LEVEL OF LIQUID BY RESISTIVE WIRE

The present invention is concerned with detecting the level of a liquid.

The applicants have already proposed, in U.S. Pat. No. 4,163,391, an apparatus for monitoring the level of liquid in a tank or reservoir. That apparatus, the disclosure of which is hereby incorporated by reference comprises a resistive wire probe which is partially immersed in the liquid in a generally non-horizontal direction, supply means capable of applying electrical energy to the probe, means which are responsive to at least one of the electrical parameters voltage and current in the probe, and means for monitoring the variation in said parameter from its initial value, when electrical energy is first applied, in order to deduce therefrom information relating to the level of liquid. The level information produced in accordance with that prior patent is fairly reliable for providing a warning when a level threshold for example is attained.

However, it has been found that it is desirable to produce more accurate information relating to the level of liquid, in spite of the complexity of the problems involved from the thermal point of view, and that is the aim of the present invention.

For that purpose, the proposed apparatus comprises means for registering at least one table of correspondence between possible digital values of a differential parameter representing the variation in said parameter, and respectively associated digital level values, and a monitoring means for digitally measuring said differential parameter in order to display the corresponding level from said table.

In accordance with another important aspect of the invention, the apparatus comprises means for memorizing a set of auxiliary correspondence tables defining digital corrections regarding the differential parameter depending on the uncorrected value thereof, means for selecting one of said auxiliary tables depending on the initial value of the electrical parameter and means for applying to the uncorrected differential parameter the associated correction in the table which is thus selected.

In a highly advantageous fashion, the apparatus further comprises means for memorizing a third table of correspondences between said initial value of the electrical parameter and corresponding digital temperature values, and means capable of displaying the temperature corresponding to the initial value encountered.

In a first embodiment, the supply means is of the constant current type and the electrical parameter detected is the voltage at the terminals of the probe.

In accordance with another embodiment, the supply means is of the voltage source type, the probe is in series with a resistor, and the voltages are detected at the terminals of the probe and the resistor.

In an alternative embodiment, if the supply voltage is liable to vary excessively (motor vehicle battery for example), the supply means comprise an assembly for supplying the probe a constant voltage, with detection of a parameter relating to the current flowing therethrough.

In accordance with another alternaive embodiment, means are provided for monitoring a variation in voltage and current in the probe in order to apply a predetermined total amount of energy thereto.

In all of the following equations, the subscript $_0$ indicates the initial value of the parameter being measured where as the subscript $_1$ indicates the parameter value after a predetermined time.

In a first mode of carrying the invention into effect, the differential parameter is equal to the difference $(U_1-U_0)$ between the values of the initial voltage at the zero supply moment and after a predetermined time $(T_1)$.

In a second mode of carrying the invention into effect, the resistance (A) of the probe is calculated from the voltages U and/or V at the terminals of the probe and a series resistor R, the values of U and V being measured at the initial moment of supply and at the end of a predetermined time $T_1$, while said differential parameter is of the following form:

$$K = U_1^2 \frac{A_0}{A_1(A_1 - A_0)}$$

in which the indexes zero and one respectively denote a value at the moment zero and a value at the moment $t_1$.

In a third mode of carrying the invention into effect, the differential parameter is of the following form:

$$FN = R^2 \frac{U_1/V_1 - U_0/V_0}{V_1^2/R}$$

in which R is a resistor in series with the probe, U and V are the voltages at the terminals of the probe and the resistor R, the index zero represents the moment at which the supply begins, and the index one represents a predetermined moment subsequent to the end of the supply period.

In a fourth mode of carrying the invention into effect, the differential parameter is the time taken by the monitored parameter to reach a reference value.

BRIEF DESCRIPTION OF THE DRAWINGS

Other features and advantages of the invention will be apparent from the following detailed description and the accompanying drawings in which.

DETAILED DESCRIPTION OF THE PREFERRED EMBODIMENTS

Figure 1:
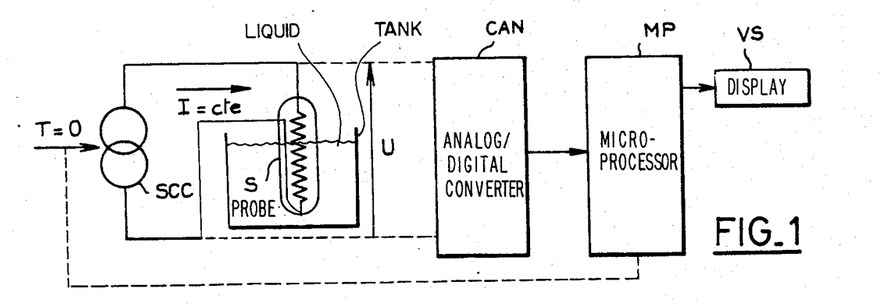
FIGS. 1 to 5 show four different embodiments of the assembly incorporating a wire probe in accordance with the invention.

In FIG. 1, the reference SCC denotes a constant current source which is capable of being controlled for directly supplying a probe S with a constant current I. The probe S is the resistive wire probe which is immersed in the liquid tank or reservoir, in a generally non-horizontal or vertical direction. The voltage U at the terminals of the probe is taken off by means of an analog-digital converter CAN, the output of which is connected to a microprocessor MP. The microprocessor is operable to control the constant current source SCC to set it in operation at a moment which will be defined by $T=0$, and stop it at the end of a certain period of time which will be designated $T_1$. The microprocessor MP is also connected to a display or visualization member VS.

Figure 1A:
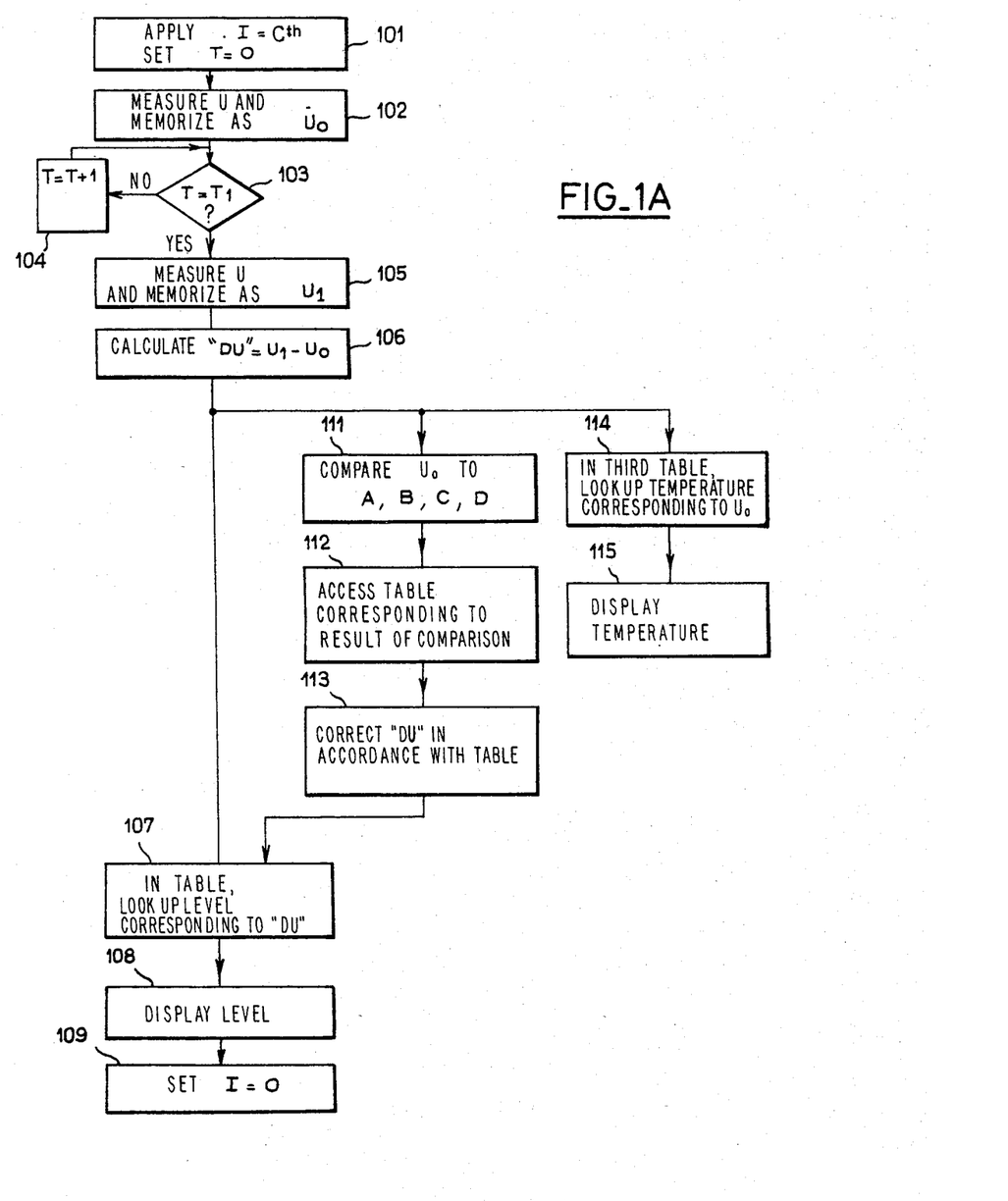
FIGS. 1A, 2A, 3A, 4A, 4B and 5A are different operating programs illustrating the complementary operations carried out in the apparatuses shown in the FIGS. 1–5, respectively.

The apparatus shown in FIG. 1 is capable of operating with command functions in the microprocessor which are illustrated by the operating program shown in FIG. 1A, at the same time as the corresponding memorization or storage functions occur.

Referring to FIG. 1A, it will be seen therein that step 101 comprises applying the constant current, by energizing the source SCC, while initializing the time (T=0). Virtually at the same moment, step 102 will involve measuring the voltage U, and memorizing it as the value $U_0$. Then, steps 103 and 104 constitute a chronometric loop for time incrementation in per se known member. When a period $T_1$ after the initial moment has elapsed, operation proceeds to step 105 which comprises again measuring the value of U which will now be memorized as value $U_1$. Step 106 comprises calculating the differential parameter $DU=U_1-U_0$.

Then, in step 107, reference will be made to a predetermined correspondence table to ascertain the digital level value corresponding to the digital value of the differential parameter DU. Then, in step 108, that digital level value is displayed in the display means VS, whereupon step 109 can interrupt operation of the apparatus, by controlling the source SCC in such a way that it returns to its rest condition.

Proper operation of this first embodiment is based on the following observation: the law in respect of correspondence between the differential parameter DU and the real level is found to be fairly complicated but has a sufficient degree of repetitivity that it can be represented in a table, while preserving a high degree of accuracy.

In spite of accuracy of the above-mentioned table, it has been found greatly preferable for a correction to be carried out in respect of the differential parameter DU, depending on the initial measured value $U_0$.

For that purpose, steps 111 to 113 are interposed between steps 106 and 107. Step 111 comprises comparing the parameter $U_0$ to different values designated herein as A, B, C and D, etc. Depending on the result of that comparison operation, step 112 involves going to a corresponding table. For example, if $U_0$ is less than A, a first table will be sought, if $U_0$ is between A and B, a second table will be sought, and so on. After that, in step 113, the present value of DU is corrected depending on the correction entered in the table with respect to that value or more precisely with respect to a range of values containing it.

In a preferred embodiment, there is also a third table which sets out the correspondence between the temperature values and the initial values $U_0$, once again with respect to ranges or intervals. In such a case, a step 114 is added to the diagram shown in FIG. 1A, which comprises going to the third table to find a temperature corresponding to $U_0$, while the temperature can be displayed in step 115. The temperature display may be produced either in the course of the overall operating program or separately, on a special control of the microprocessor, as is conventional in relation to motor vehicles. In this way, it is possible for example to measure the level of oil in an engine, as well as the temperature thereof. It is also possible to envisage measuring the level of fuel by the same means.

Figure 2:
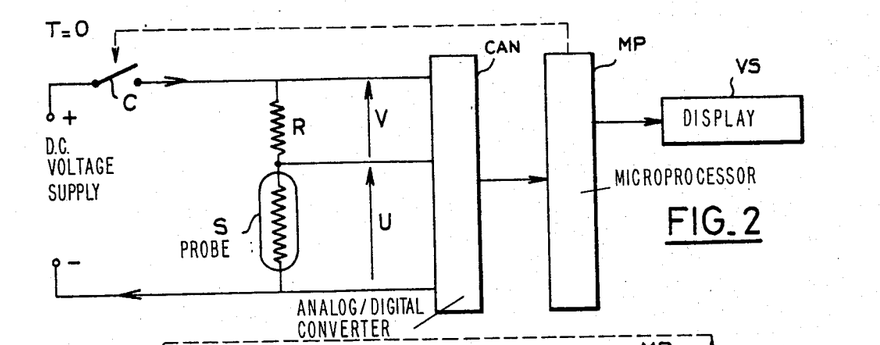

In FIG. 2, a direct voltage supply may be applied at a moment T=0, by way of a change-over switching means C, to a series assembly formed by a resistor of known value R and the probe S in accordance with the invention. The voltage U at the terminals of the probe S and the voltage V at the terminals of the resistor R are analysed and digitized by an analog-digital converter CAN connected to the microprocessor MP which on the one hand may control closure of the switching means C and on the other hand energize the display means VS.

Figure 2A:
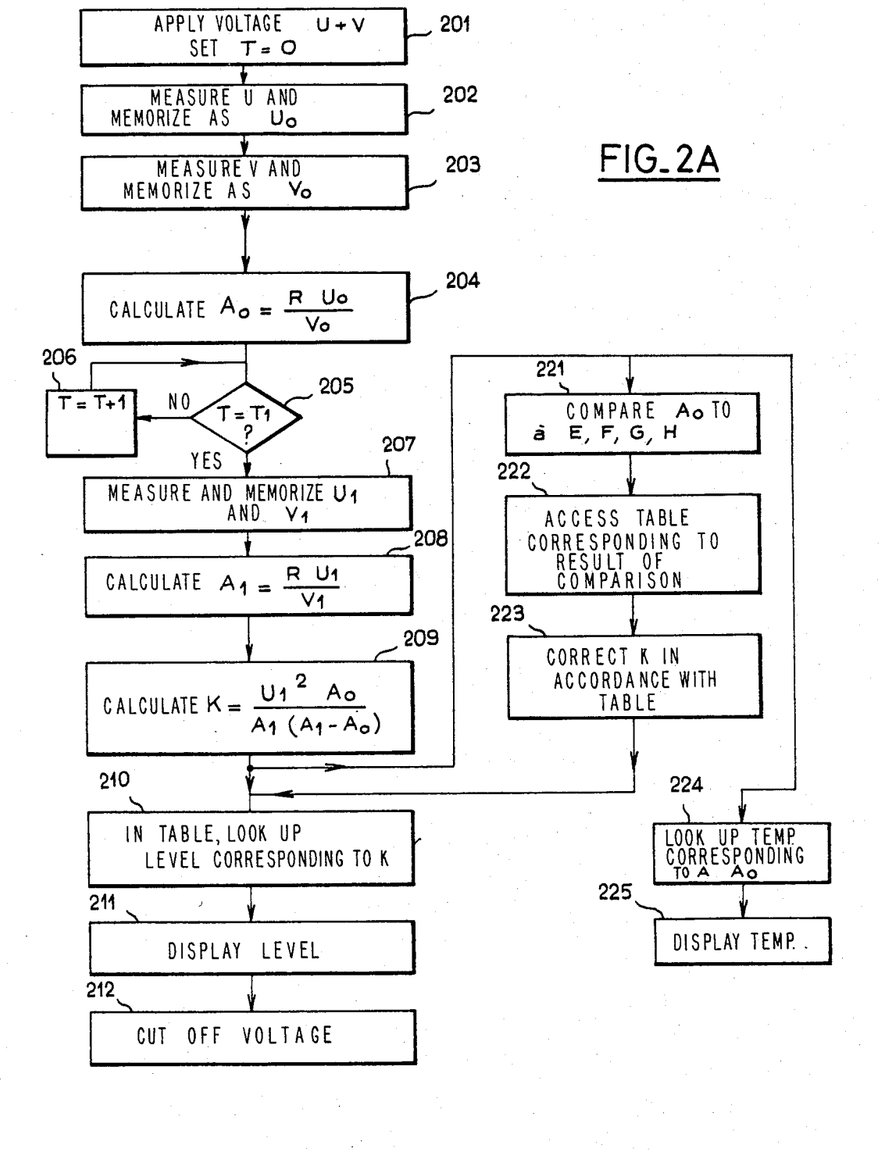

FIG. 2A shows that the first step in operation of the microprocessor comprises applying a voltage U+V, while initializing the time factor (step 201). Then, in steps 202 and 203, the values U and V are successively measured, and preserved as $U_0$ and $V_0$.

After that, in step 204, the initial resistance of the probe can be calculated, being given by:

$$A_0 = \frac{R \cdot U_0}{V_0}.$$

After that, we enter a chronometric loop formed by a test step 205 and an incrementation step 206.

AT the end of the period of time $T_1$ defined by the test step 205, we measure and memorize the parameters $U_1$ and $V_1$. Then in step 208 we calculate the fresh resistance of the probe:

$$A_1 = \frac{R \cdot U_1}{V_1}.$$

Then, step 209 comprises calculating a differential parameter designated as K, defined by the following formula:

$$K = \frac{U_1^2 A_0}{A_1 (A_1 - A_0)}$$

If the degree of accuracy demanded is not excessive, operation then goes to step 210 for directly seeking in the main table the level corresponding to the digital value of K, followed by display in step 211 and finally cutting off the supply voltage, in step 212.

In order to achieve an improved degree of accuracy, in accordance with the invention, the initial value of the resistance of the probe $A_0$ is compared to a plurality of threshold values designated herein as E, F, G and H, etc. After the step 221, step 222 comprises accessing a table corresponding to the result of the comparison operation, as described hereinbefore with reference to FIG. 1A, whereupon step 223 permits the differential parameter K to be corrected in accordance with the selected table, followed then by steps 210 to 212 as already referred to above.

In a manner similar to that described above with regard to FIG. 1A, it is also possible in the present embodiment for the temperature to be determined by locating in a third step 224 the temperature corresponding to the initial value $A_0$ of the resistance of the probe, and then displaying that temperature in step 225.

Figure 3:
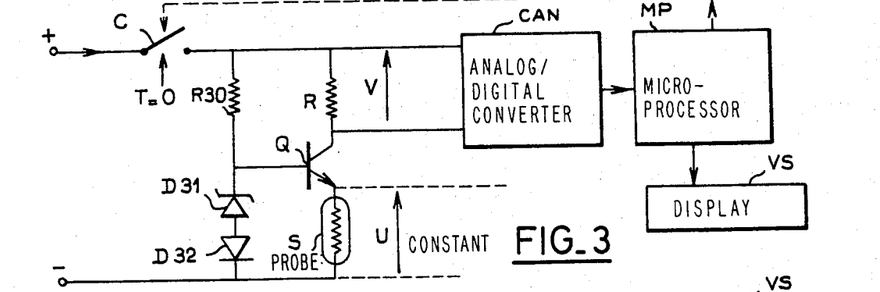

In some uses, the voltage level from the d.c. voltage source may vary fairly substantially. In that case, use may be made of the embodiment shown in FIG. 3 wherein, downstream of the control switching means C, the arrangement includes an assembly for generating constant voltage at the terminals of the probe. The assembly comprises, between the positive and negative terminals of the source, a biassing means formed by a resistor R30 followed by a Zener diode D31 which is arranged in the blocking direction and a normal diode D32 which is disposed in the transmitting direction. In this way, the node which is common to the Zener diode and to the resistor will control the base of a transistor Q, in a manner which is virtually insensitive to temperature. The emitter of the transistor Q is connected to the probe S which on the other hand goes to the negative terminal, while the collector of the transistor is connected to a resistor R which goes to the positive terminal, by way of the switching means C. It will be seen at once that the voltage across the terminals of the probe S is constant and can therefore be definitively memorized in the microprocessor MP. The voltage V across the terminals of the resistor R is analysed and measured by an analog-digital converter CAN which then transmits it to the microprocessor. The latter can easily deduce therefrom the current through the probe, since the current I is equal to V/R.

Figure 3A:
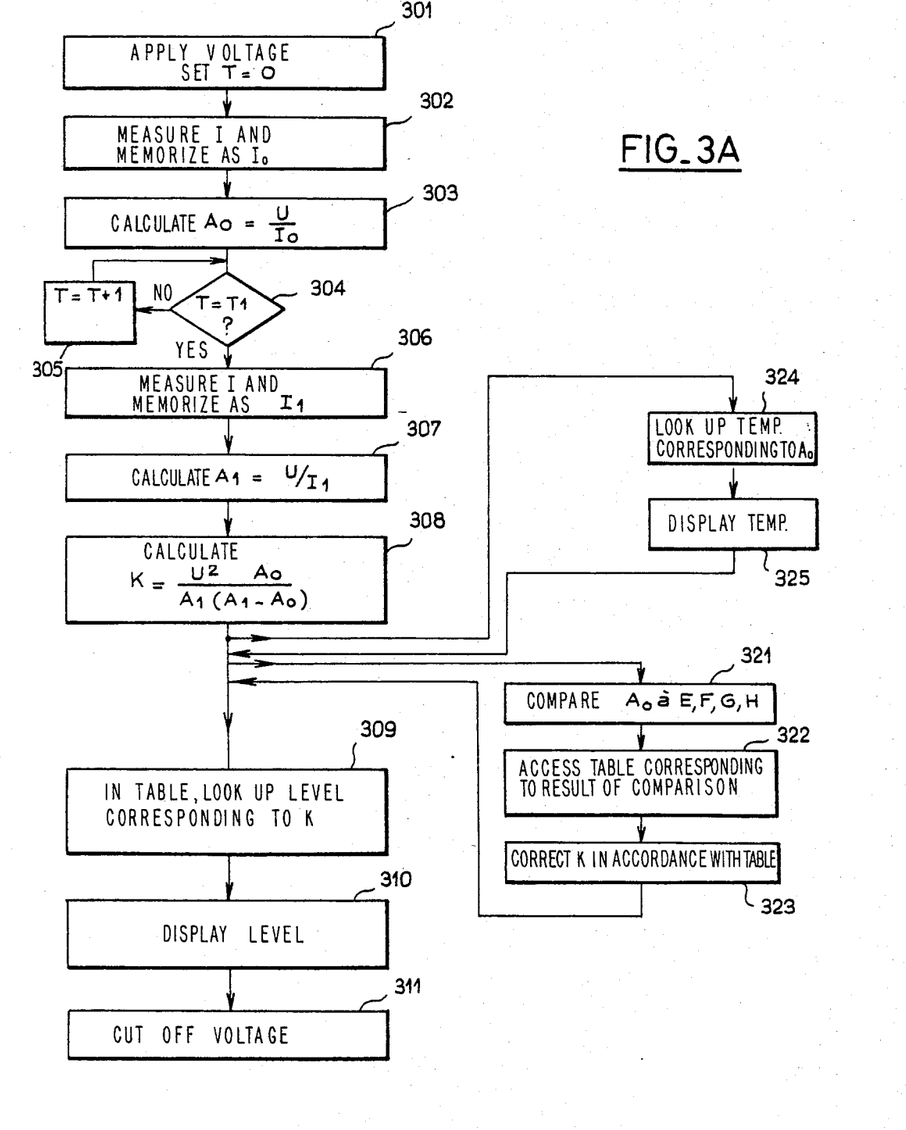

After the initialization step 301 in FIG. 3A, which involves applying the supply voltage at the moment T=0, the current I in the probe will then be measured, that current being referred to as $I_0$, the initial current. After that step 302, the initial resistance of the probe is calculated as described above, by means of the relationship: $A_0=(U/I_0)$, wherein U is constant and known. After the chronometric test steps 304 and 305, the current can be measured again, and memorized as value $I_1$, in step 306, after a delay period $T_1$, followed by calculation of the fresh resistance of the probe $A_1$ at step 307.

Step 308 is similar to step 209 in FIG. 2A except that, instead of a measured value $U_1$, a predetermined value U is used. The remainder of FIG. 3A precisely corresponds to the matter described hereinbefore with reference to FIG. 2A.

Figure 4:
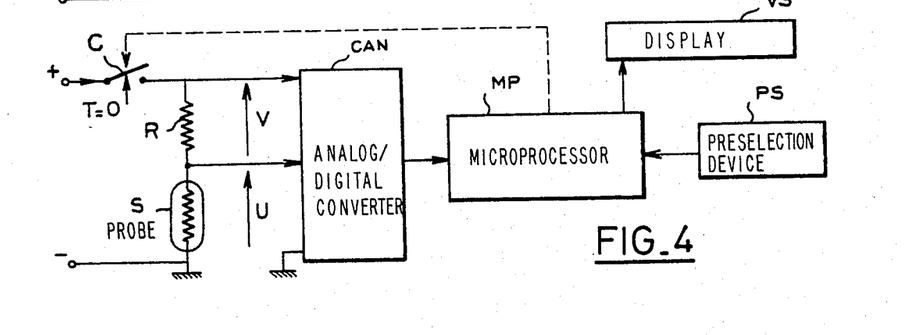

FIG. 4 shows a diagrammatic view which constitutes an alternative form of the embodiment shown in FIG. 2 but which may be applied to the other Figures. The main difference is that a predetermined value, designated WF, is introduced by means of a preselection device PS. The predetermined value WF represents a constant energy which is to be applied to the probe. It will be seen however with reference to FIG. 4A that the mode of operation in this case is fairly different.

Figure 4A:
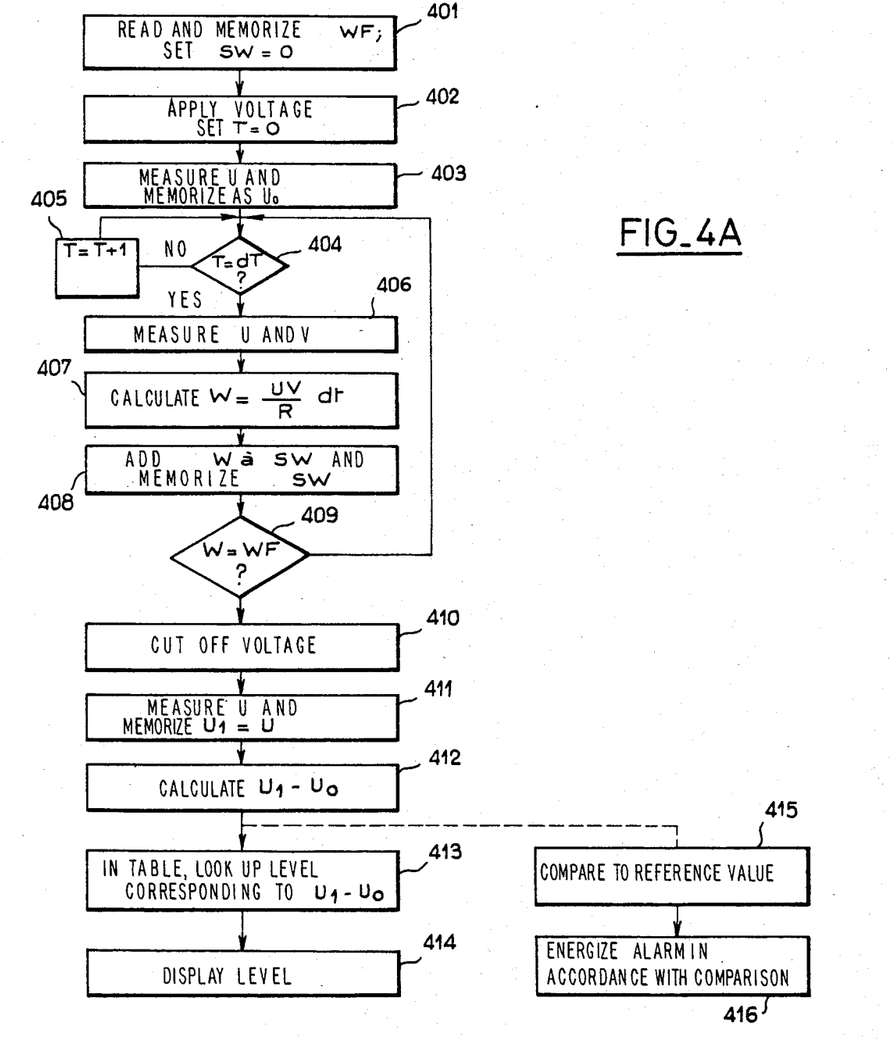

The initial step 401 comprises receiving and memorizing the value WF introduced from the preselection device, while zeroing an accumulating means indicated as SW step 401. Step 402 comprises applying a voltage by closing the switching means C, while effecting time initialization. Then, in step 403, U is measured, being retained as initial value $U_0$. Step 404 does not detect the elapsing of the predetermined period of time (i.e. Ti-To) but the passage of a time element (dT). As described above, chronometry is maintained by means of a chronometric operation 405. It will of course be noted that chronometry must be markedly more accurate so that it is possible to monitor the time element dT which is markedly less than the value $T_1$ which has been referred to above. Each time that a time element dT elapses, the current values of U and V are measured in step 406, and a value W=UV/R . dt is then calculated, as indicated in step 407. Then, the value W is added to the abovementioned accumulating means SW, and is retained in memory in step 408. If the initially introduced value WF is not yet attained, step 409 reverts upstream to the chronometric step 404 to continue operations. If on the other hand the desired energy is attained, the voltage supply is cut off in step 410. The voltage U which will give the value $U_1$ is then measured, in step 411. Then, in step 412 the differential parameter $U_1-U_0$ is calculated.

After that, a main table is consulted to find the level corresponding to the value of the differential parameter $U_1-U_0$ in step 413, followed by display in respect of the level, in step 414.

A relatively simple alternative embodiment involves comparing the different parameter with a reference value in step 415, and then energizing an alarm in accordance with that comparison. This alternative embodiment makes it possible for example to monitor an important threshold level, as may be the level of oil in a vehicle.

Although they are not shown, the same variations as described above may be included in the FIG. 4A mode of operation, namely rectification of the differential parameter in dependence on a comparison of the initial value $U_0$ to different digital ranges, and by selecting a corresponding correction table. Likewise, it will be appreciated that it is possible to envisage temperature display, provided that the supply voltage on starting up the arrangement is known with sufficient accuracy.

The alternative embodiment described above has the advantage of not requiring the supply voltage to be constant, allowing it to vary within certain limits.

Figure 4B:
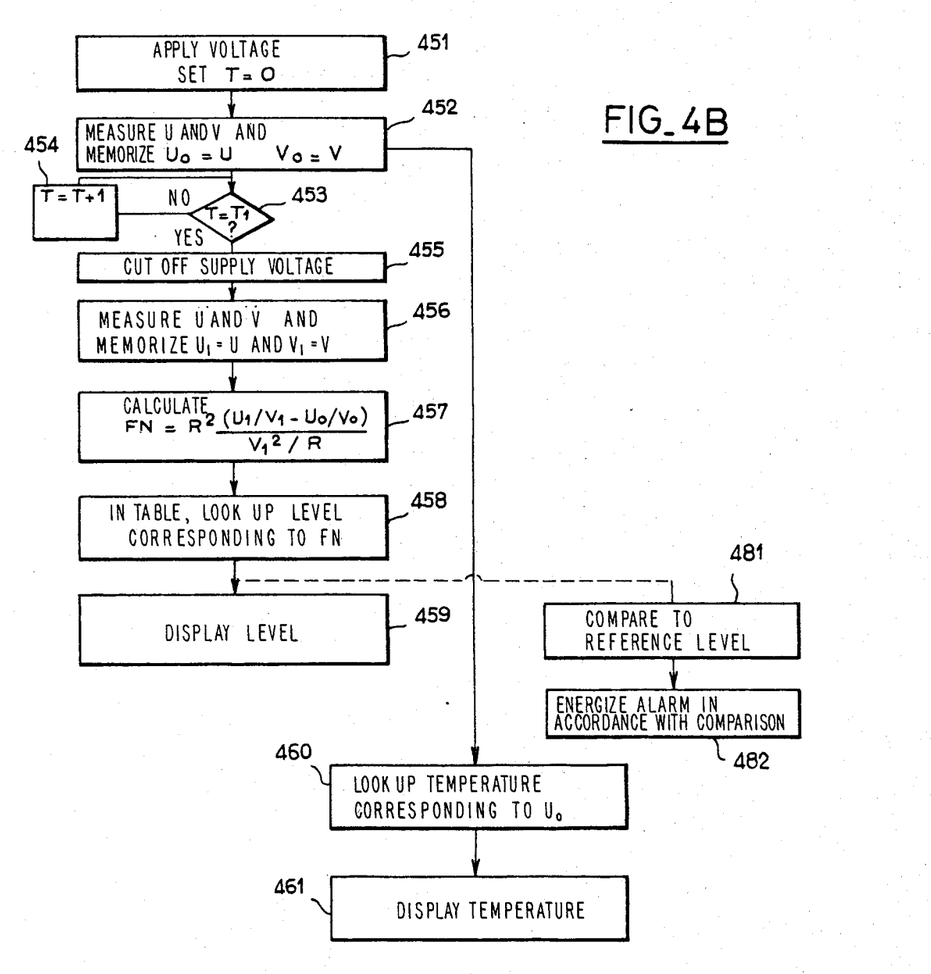

The embodiment shown in FIG. 4, without the member PS, or the embodiment shown in FIG. 2, may operate in a different manner as defined by the operating program shown in FIG. 4B.

In that case, the initial step 451 comprises applying the supply volage, with time initialization. After that, in step 452, measurement is made of the values U and V which are memorized as initial values $U_0$ and $V_0$. After that, operation can jump directly to steps 460 and 461 which comprise seeking a corresponding temperature and displaying it.

The main line of the operating program assumes that, to compensate, operation proceeds by way of the chronometric steps 453 and 454 which permit the elapse of a period of time $T_1$ from an initial moment to be determined.

In contrast to the operation described for example in FIG. 2A, after the moment $T_1$, the supply voltage is cut off, at step 455.

Immediately or shortly thereafter, step 456 comprises a fresh measurement in respect of the electrical parameters U and V which are memorized as $U_1$ and $V_1$ respectively.

Then, step 457 comprises calculating a differential parameter designated herein as FN, and defined by the following relationship:

$$FN = R^2 \frac{(U_1/V_1 - U_0/V_0)}{V_1^2/R}$$

After that, step 458 comprises finding in the main table, a level corresponding to the value FN, that level being displayed at step 459.

In an alternative form or in addition, step 481 comprises comparing that level with a reference value while step 482 permits a warning device or alarm to be actuated, depending on the result of the comparison operation (the warning or alarm means are not shown in the drawings illustrating the components of the arrangement).

Here too, this embodiment may obviously incorporate the same variations in regard to correction of the differential parameter depending on the given initial values.

Figure 5:
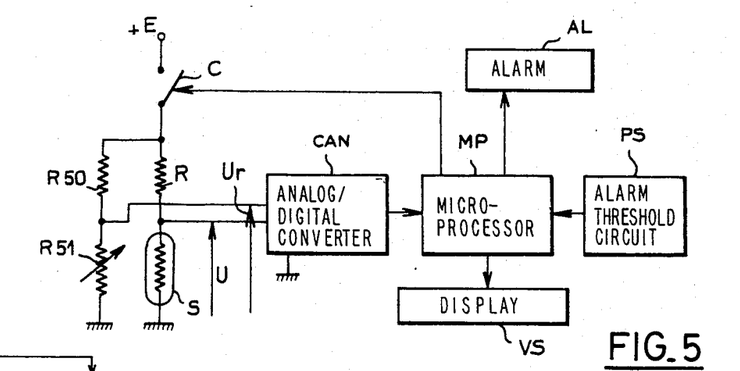

FIG. 5 illustrates another embodiment of an electrical circuit according to the invention. In this case, a voltage designated herein as +E is applied by way of a change-over switching means C to a series assembly comprising a resistor R of known value, and the probe S. The voltage U at the terminals of the probe S is measured by means of the analog-digital converter CAN which is connected to the microprocessor MP, the latter being capable of receiving a threshold voltage from a preselection device PS, at the same time as energizing the digital display or visualization means VS, as well as the warning means AL.

Disposed in parallel with the resistor R and the probe S are two resistors R50 and R51 forming a voltage divider, one thereof being controllable. The common point of the two resistors will therefore give a reference voltage $U_r$, the value of which is directly related to any variation in the supply voltage +E.

Figure 5A:
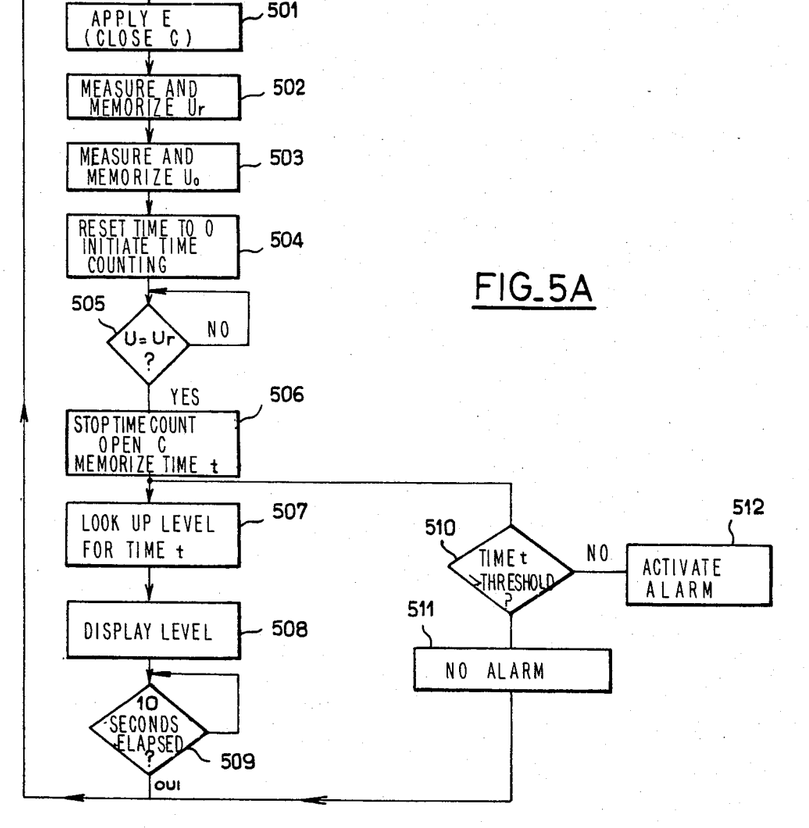

FIG. 5A shows an example of a corresponding operating program. In step 501, the voltage E is applied by closing the switching means C under the control of the microprocessor MP. Immediately, in step 502 the voltage $U_r$ is measured and memorized, while in step 503 the voltage $U_0$, which is equal to the initial voltage at the terminals of the probe is measured and memorized. At step 504, in a very short time, time zeroing is effected and a time counting operation is initiated. Step 505 comprises a monitoring test to ascertain if the voltage U does or does not become equal to the reference voltage $U_r$. As long as the voltages are not equal, a waiting position is retained by coupling to the test step 505.

When a condition of equality is attained, the time counting operation is stopped in step 506, with the switching means C being opened and the elapsed time t being memorized.

In step 507, the digital level corresponding to the digital value of the time t is looked-up in a main table. Step 508 comprises displaying the level while finally test 509 checks to determine if a period of time, for example ten seconds of display have elapsed. This permits the level display to be maintained for a time period in the present example of ten seconds, followed if necessary by a return to step 501 to recommence a fresh measuring operation, the latter being relatively independent of the value of the supply voltage.

As a complementary feature, it is possible to provide a test step 510 which detects if the time t elapsed until the condition attained is such that $U=U_r$ is greater than the threshold value introduced by means of the device PS. If not, the alarm 512 is activated permanently, for example until zero resetting is carried out by the operator. In the opposite situation, in step 511, a decision is made not to activate the alarm, and the program is resumed at step 501.

The foregoing description indicates many embodiments of the invention, with the different alternative forms thereof, which can be broadly applied to all of the different embodiments.

It will be appreciated that the present invention is not limited to the various embodiments described but extends to cover any alternative form in accordance with the spirit thereof. In particular, the probe is not necessarily a straight wire and the wire may be mounted in a zig-zag configuration, wound in a vertical helix or suspended between two points at the same level (a shape of the parabola or catenary kind). Such an arrangement makes it possible in particular to control the response of the probe in dependence on level, to take account for example of the shape of the tank or reservoir.

We claim:

1. An apparatus for determining a level of a liquid in a tank comprising:
   a temperature dependent resistive wire probe at least partially immersed in said liquid in a generally vertical orientation in said tank, said resistive probe sensing variations in the liquid level;
   a power supply for applying electrical energy to said resistive wire probe;
   means for detecting an electrical parameter in said resistive wire probe;
   means for memorizing an initial value of said electrical parameter when electrical energy is applied to said resistive wire probe;
   means for monitoring any variation in said electrical parameter from its initial value and for generating a differential parameter representative of the variation in said electrical parameter, said differential parameter being related to the level of liquid;
   converting means for converting said differential parameter into digital values;
   means for storing a plurality of correspondence tables defining digital corrections of the differential parameter digital values generated by said converting means said tables being associated with initial values of said parameters being detected;
   means for selecting the associated one of said plurality of correspondence tables depending upon the memorized initial value of said electrical parameter being detected;
   means for determining from said selected correspondence table, a digital correction corresponding to the differential parameter digital value generated by said converting means, and for generating a corrected differential parameter digital value.

2. An apparatus for determining a level of a liquid in a tank comprising:
   a temperature dependent resistive wire probe at least partially submersed in said liquid in a generally vertical orientation in said tank, said resistive probe sensing variations in the liquid level;
   a power supply for applying electrical energy to said probe;
   means for detecting an electrical parameter of said probe;
   means for memorizing an initial value of said electrical parameter when electrical energy is applied to said probe;
   means for comparing said electrical parameter with a reference value and for calculating a differential parameter representative of an elapsed time taken for said electrical parameter to reach said reference value, said differential parameter being related to the level of said liquid;
   converting means for converting said differential parameter into digital value;
   means for storing a plurality of correspondence tables defining digital corrections of the differential parameter digital values generated by said converting means, said tables being associated with initial values of said parameter being detected;
   means for selecting the associated one of said plurality of correspondence tables depending upon the memorized initial value of said electrical parameters being detected;

means for determining from said selected correspondence table, a digital correction corresponding to the differential parameter digital value generated by said converting means, and for generating a corrected differential parameter digital value;

memory means for storing a table of correspondence between possible digital values of said corrected differential parameter and associated digital liquid level values;

means for determining from said memory means a digital liquid level value corresponding to said corrected differential parameter digital value;

display means for displaying said digital liquid level value.

3. An apparatus for determining a level of a liquid in a tank comprising:

a temperature dependent resistive wire probe at least partially submersed in said liquid in a generally vertical orientation in said tank, said resistive probe sensing variations in the liquid level;

a power supply for supplying electrical energy to said probe;

means for limiting the amount of energy supplied to said probe to a predetermined amount;

means for detecting an electrical parameter of said probe;

means for memorizing an initial value of said electrical parameter when electrical energy is applied to said probe;

means for determining when the energy applied to said probe equals said predetermined amount;

means for monitoring any variation in said electrical parameter from its initial value until said energy supplied equals said predetermined amount and for calculating a differential parameter representative of the variation in said electrical parameter, said differential parameter being related to the level of said liquid;

converting means for converting said differential parameter into digital values;

means for storing a plurality of correspondence tables defining digital corrections of the differential parameter digital values converted by said converting means, said tables being associated with initial values of said parameter being detected;

means for selecting the associated one of said plurality of correspondence tables depending upon the memorized initial value of said electrical parameters being detected;

means for determining from said selected correspondence table, a digital correction corresponding to the differential parameter digital value converted by said converting means, and for generating a corrected differential parameter digital value;

memory means for storing a table of correspondence between possible digital values of said corrected differential parameter and associated digital liquid level values;

means for determining from said memory means a digital liquid level value corresponding to said corrected differential parameter digital value;

display means for displaying said digital liquid level value.

4. An apparatus for determining a level of a liquid in a tank comprising:

a temperature dependent resistive wire probe at least partially submersed in said liquid in a generally vertical orientation in said tank, said resistive probe sensing variations in the liquid level;

a power supply for applying electrical energy to said probe through a series resistance;

means for detecting an electrical parameter of said probe and of said resistance;

means for memorizing initial values of said electrical parameter of said probe and said resistance when electrical energy is applied to said probe and resistance;

means for monitoring any variation in said electrical parameter of said probe and resistance from said initial values and for calculating a differential parameter representative of the variation in said electrical parameters, said differential parameter being related to the level of said liquid;

converting means for converting said differential parameter into digital values;

means for storing a plurality of correspondence tables defining digital corrections of the differential parameter digital values generated by said converting means, said tables being associated with initial values of said parameter being detected;

means for selecting the associated one of said plurality of correspondence tables depending upon the memorized initial values of said electrical parameter of said probe and resistance;

means for determining from said selected correspondence table, a digital correction corresponding to the differential parameter digital value generated by said converting means, and for generating a corrected differential parameter digital value;

memory means for storing a table of correspondence between possible digital values of said corrected differential parameter and associated digital liquid level values;

means for determining from said memory means a digital liquid level value corresponding to said corrected differential parameter digital value;

display means for displaying said digital liquid level value.

5. The apparatus of claim 3 wherein said power supply supplies a substantially constant voltage and said electrical parameter comprises a voltage across said probe.

6. The apparatus of claim 4 wherein said electrical parameters comprise the voltages across said resistance and said probe respectively and the differential parameter (FN) is of the following form:

$$FN = R^2 \frac{U_1/V_1 - U_o/V_o}{V_1^2/R}$$

where
R = value of the series resistance
$U_o$ = voltage across the probe at an initial time $T_o$
$V_o$ = voltage across the resistance at a predetermined time $T_o$
$U_1$ = the voltage across the probe at time $T_1$
$V_1$ = voltage across the resistance at time $T_o$.

7. The apparatus of claim 5 or 6 in which said predetermined time is established by means for monitoring the electrical parameter of said probe in order to apply thereto only a predetermined total amount of energy.

8. A method for determining a level of a liquid in a tank using a temperature sensitive resistive wire probe at least partially immersed in said liquid, in a generally vertical orientation in said tank comprising:

supplying electrical energy to said probe;

limiting the amount of energy supplied to said probe to a predetermined amount;

detecting an electrical parameter of said probe;

memorizing an initial value of said electrical parameter when electrical energy is applied to said probe;

determining when the energy applied to said probe equals said predetermined amount;

monitoring any variation in said electrical parameter from its initial value until said energy supplied equals said predetermined amount;

calculating a differential parameter representative of the variation in said electrical parameter, said differential parameter being related to the level of said liquid;

converting said differential parameter into digital values;

storing a plurality of correspondence tables defining digital corrections of the differential parameter digital values generated by said converting means said correspondence tables being associated with initial values of said parameter being detected;

selecting the associated one of said plurality of correspondence tables depending upon the memorized initial value of said electrical parameter being detected;

determining from said selected correspondence table, a digital correction corresponding to the differential parameter digital value;

generating a corrected differential parameter digital value;

storing a table of correspondence between possible digital values of said corrected differential parameter and associated digital liquid level values;

determining from said table of correspondence a digital liquid level value corresponding to said corrected differential parameter digital value; and displaying said digital liquid level value.

9. A method for determining a level of a liquid in a tank using a temperature dependent resistive wire probe at least partially immersed in said liquid, in a generally vertical orientation in said tank comprising:

applying electrical energy to said probe through a series resistance;

detecting an electrical parameter of said probe and of said resistance;

memorizing initial values of said electrical parameter of said probe and said resistance when electrical energy is applied;

monitoring any variation in said electrical parameter of said probe and resistance from said initial values;

calculating a differential parameter representative of the variation in said electrical parameters, said differential parameter being related to the level of said liquid;

converting said differential parameter into digital values;

storing a plurality of correspondence tables defining digital corrections of the differential parameter digital values generated by said converting means, said correspondence tables being associated with initial values of said parameter being detected;

selecting the associated one of said plurality of correspondence tables depending upon the memorized initial values of said electrical parameter of said probe and resistance;

determining from said selected correspondence table, a digital correction corresponding to the differential parameter digital value;

generating a corrected differential parameter digital value;

storing a table of correspondence between possible digital values of said corrected differential parameter and associated digital level values;

determining from said table of correspondence a digital liquid level value corresponding to said corrected differential parameter digital value; and displaying said digital liquid level value.

10. A method for determining a level of a liquid in a tank using a temperature dependent resistive wire probe at least partially immersed in the liquid, in a generally vertical orientation in said tank comprising:

applying electrical energy to said probe;

detecting an electrical parameter in said probe;

memorizing an initial value of said electrical parameter when electrical energy is applied to said probe;

monitoring any variation in said electrical parameter from its initial value and calculating a differential parameter representative of the variation in said electrical parameter, said differential parameter being related to the level of liquid;

converting said differential parameter into digital values;

storing a plurality of correspondence tables defining digital corrections of the differential parameter digital values generated by said converting means, said correspondence tables being associated with initial values of said parameter being detected;

selecting the associated one of said plurality of correspondence tables depending upon the memorized initial value of said electrical parameter being detected;

determining from said selected correspondence table, a digital correction corresponding to the differential parameter digital value;

generating a corrected differential parameter digital value;

storing a table of correspondence between possible digital values of said corrected differential parameter and associated digital level values;

determining from said table of correspondence a digital level value corresponding to the corrected differential parameter digital value; and displaying the corrected digital level value.

11. An apparatus for determining a level of a liquid in a tank comprising:

a temperature dependent resistive wire probe at least partially immersed in said liquid in a generally vertical orientation in said tank, said resistive probe sensing variations in the liquid level;

a power supply for applying electrical energy to said resistive wire probe;

means for detecting an electrical parameter in said resistive wire probe;

means for memorizing an initial value of said electrical parameter when electrical energy is applied to said resistive wire probe;

means for monitoring any variation in said electrical parameter from its initial value and for generating a differential parameter representative of the variation in said electrical parameter, said differential parameter being related to the level of liquid;

converting means for converting said differential parameter into digital values;

means for storing a plurality of correspondence tables defining digital corrections of the differential parameter digital values generated by said converting means said tables being associated with initial values of said parameter being detected;

means for selecting the associated one of said plurality of correspondence tables depending upon the memorized initial value of said electrical parameter being detected;

means for determining from said selected correspondence table, a digital correction corresponding to the differential parameter digital value generated by said converting means, and for generating a corrected differential parameter digital value;

a second memory for storing a table of correspondence between possible digital values of said corrected differential parameter and associated digital level values;

means for determining from said second memory means a digital level value corresponding to the corrected differential parameter digital value; and display means for displaying the corrected digital level value.

12. The apparatus of claim 11 wherein the differential parameter comprises a time period for the electrical parameter monitoried to reach a predetermined reference value.

13. The apparatus of claim 11 wherein said electrical parameter comprises one of the voltage across and current through said resistive wire probe.

14. The apparatus of claim 11 further comprising means for generating a temperature value corresponding to said initial value of said electrical parameter.

15. The apparatus of claim 14 further comprising means for displaying said temperature value.

16. The apparatus of claim 15 wherein said means for generating a temperature value comprises a third memory for memorizing a table of correspondence between said initial value of said electrical parameter and a corresponding digital temperature value.

17. The apparatus of claim 11 wherein said power supply is a constant current type power supply, and the electrical parameter detected is the voltage across said resistive wire probe.

18. The apparatus of claim 17 wherein the differential parameter is equal to a difference between said initial value and a voltage across said probe after a predetermined elapsed time.

19. The apparatus of claim 11 wherein the power supply is a d.c. voltage-type power supply, and the resistive wire probe is in electrical series with a resistor and voltages across the probe and the resistor are detected.

20. The apparatus of claim 19, wherein the differential parameter (K) is defined by the following formula:

$$K = \frac{U_1^2 A_o}{A_1 (A_1 - A_o)}$$

in which
$A_o$ = the initial resistance of the probe at an initial time $T_o$
$A_1$ = the resistance of the probe at a predetermined time $T_1$
$U_1$ = the voltage across the probe at the time $T_1$.

21. The apparatus of claim 20 wherein the initial voltage across the probe is $U_o$ and the initial voltage across the series resistor is $V_o$ and $$A_o = R \frac{U_o}{V_o}$$

where R equals the resistance of said series resistor.

22. The apparatus of claim 20 wherein said power supply comprises a substantially constant voltage type power source.

23. The apparatus of claim 20 further comprising a chronomatic means for incrementing the time from the initial time To to a later time Ti and for determining the resistance, $A_1$ of said probe at said later time $$\text{wherein } A_1 = R \frac{U_1}{V_1}$$

where
$U_1$ = the voltage across said probe at time $T_1$
$V_1$ = the voltage across said resistor at time $T_1$.

24. The apparatus of claim 11 wherein the power supply comprises a substantially constant voltage supply and wherein said electrical parameter comprises a current flowing through said probe.

25. The apparatus of claim 24 wherein the probe is in series with a resistor and the voltage across the resistor is detected, said voltage across the resistor being proportional to the current flowing through the probe.

26. The apparatus of claim 25 wherein the differential parameter (K) is defined by the following formula:

$$K = \frac{U^2 A_o}{A_1 (A_1 - A_o)}$$

in which
$A_o$ = the resistance of the probe at an initial time $T_o$
$A_1$ = the resistance of the probe at a predetermined time $T_1$
U = the voltage across the probe.

* * * * *